April 22, 1952 W. J. DORSAM ET AL 2,593,858
CHART ADVANCING MECHANISM

Filed Feb. 8, 1947 2 SHEETS—SHEET 1

Inventors:
William J. Dorsam
Louis A. Paine
Richard A. Road
By:— Louis Robertson  atty.

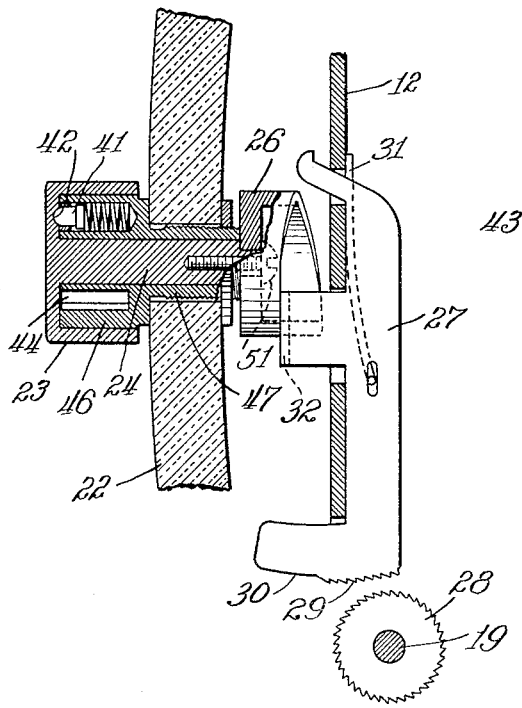

Patented Apr. 22, 1952

2,593,858

UNITED STATES PATENT OFFICE 2,593,858

CHART ADVANCING MECHANISM

William J. Dorsam, La Fayette, Louis A. Paine and Richard A. Road, West Lafayette, Ind., assignors to Duncan Electric Manufacturing Company, La Fayette, Ind., a corporation of Illinois Application February 8, 1947, Serial No. 727,360

7 Claims. (Cl. 74—122)

The present invention represents an improvement on the invention of William J. Dorsam, one of the present inventors, disclosed in an application filed October 11, 1945, Serial No. 621,726. In that application, means was provided for advancing a chart mechanism inside of a meter case without opening the cover of the meter. This is highly desirable because meter covers are preferably substantially dust-tight and almost never opened.

In the type of meter for which the invention of said Dorsam application was devised, it is desirable to advance the chart a small amount at the end of each billing period. In other words, when the meter-reader comes around, he not only takes the reading of the meter but he also operates a button to advance the chart to the stylus. The Dorsam invention provided a device for advancing the chart, but the present invention is an improvement in making more certain that the chart advancing spindle will be turned exactly the same amount each time. According to the present invention, this is accomplished in spite of substantial variations in the relative positions of the knob on the cover and the part of the mechanism operated thereby.

This result is accomplished by providing a cam which is turned by the knob and which has a throw considerably greater than that necessary for the desired movement, the excess allowing for irregularities. The excess throw of the cam is prevented from causing an excess movement of the chart by virtue of the fact that only a predetermined number of teeth are provided on the chart operating segment, the segment continuing to move, but without effect, after the teeth have turned the chart spindle a predetermined amount.

Additional objects and advantages will be apparent from the following description and from the drawings in which.

Figure 1:
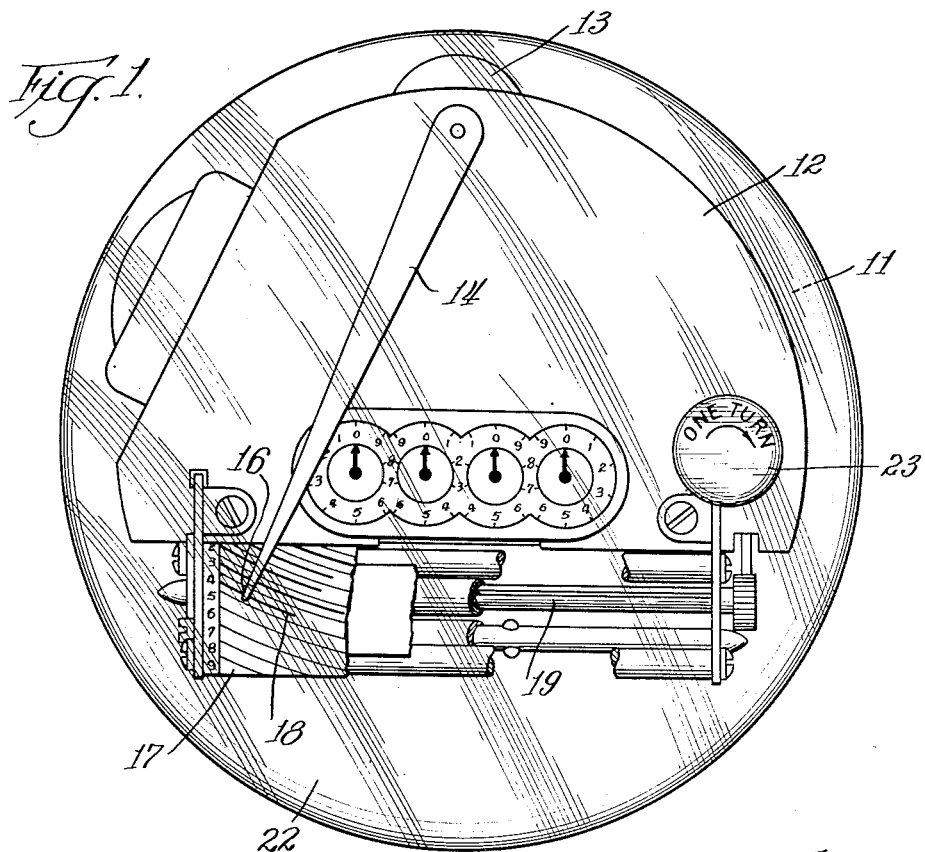
Figure 1 is a somewhat diagrammatic face view of a meter embodying this invention with parts partly broken away for the sake of clarity.

Figs. 4, 5, and 6 are fragmentary, sectional views showing three successive positions of the chart moving mechanism, Fig. 4 showing an axial, sectional view through the operating button.

Although the law requires a full and exact description of at least one form of the invention, such as that which follows, it is, of course, the purpose of a patent to cover each new inventive concept therein no matter how it may later be disguised by variations in form or additions of further improvements; and the appended claims are intended to accomplish this purpose by particularly pointing out the parts, improvements, or combinations in which the inventive concepts are found.

The invention has been illustrated in conjunction with a combined watthour and maximum demand meter carried by a base 11. The watthour meter mechanism which is carried by the base plate 11 is mostly hidden behind a support plate 12. A thermal demand unit 13 controls a pointer 14 which carries a stylus 16 adjacent its tip. The stylus moves along a chart 17. Preferably, the stylus 16 is a hot wire and the chart 17 is a heat-sensitive paper, such as a very thin paper with a heat-sensitive coating thereon.

The chart 17 remains stationary throughout a billing period. During this time, the stylus 16 will move back and forth along the chart, making a mark 18 thereon. The distance this mark 18 extends to the right will indicate the maximum demand during the billing period. A scale may lie adjacent the path of the stylus 16, or vertical scale lines may be printed on the chart 17, or both.

At the end of the billing period, it is desirable for the chart to be advanced exactly one space so that the stylus will operate along approximately the center of the next space. It is desirable that specific spaces be demarked on the chart and that they be numbered or otherwise identified so that any attempt to tamper with the meter by moving the chart during the billing period will be detected.

According to the present invention, means are provided for advancing the chart at the end of the billing period by an accurately predetermined movement of the winding rod 19. As the chart paper is wound on the rod, the amount of movement of the chart paper will increase slightly with successive operations, but the paper is so thin that the increase in movement is not excessive. Of course, it will be printed with the distance between demarcations increasing minutely so that the spacing may be noticeably greater at the end of the chart than at the start of the chart.

The problem of providing dependable uniformity in the successful movements of the winding rod 19 is made difficult by several factors. The covers made commercially are not all exactly aligned and hence an operating mechanism carried by the cover will not always assume exactly the same relative position with respect to part of the operating mechanism located on the instrument within the cover. It is desirable to have the operating button or knob on the cover for convenient access, and also so that standard bases may be used. It is desirable to avoid a mechanism which depends on pushing the button all of the way because there would be too many instances in which the button simply did not get pushed quite all the way, and the chart would fail to be properly positioned.

Simplicity of construction and ease of manufacture are, of course, desired.

The foregoing factors are reconciled and a dependable means for moving the winding rod 19 an exact predetermined amount is provided according to this invention, as seen in Figs. 4 to 6.

*General operation*

To advance the chart, the knob or button 23 carried by a cover 22 is turned by the meter reader. This knob is integral with shank or shaft 24 on which is rigidly carried a cam 26. In spite of slight variations in positioning of the cover 22, the cam 26 will, except when being operated, always be in a position approximately as shown in Fig. 4. As the knob 23 is turned, the cam will come into engagement with the floatingly supported actuator 27 and move it to the position shown in Fig. 5 in which it engages the ratchet wheel 28. Continued movement of the actuator 27 under influence of the cam 26 will turn the wheel 28 until the teeth 29 on the actuator 27 pass beyond the wheel 28. Beyond teeth 29 the actuator is relieved, as at 30. Thus the movement of the ratchet wheel 28 is determined by the number of teeth 29, and by the starting position of the actuator 27. Inasmuch as it is easy to make both of these factors constant, it is easy to ensure the same movement of the wheel 28 each time and, hence, the same movement of the winding shaft 19.

As the cam 26 is turned further, the high part of the cam rides past the end 32 of actuator 27, and spring 31 returns the actuator 27 to the starting position seen in Fig. 4. As described in the co-pending Dorsam application, the first operation during the return movement is to cause the cam arm 36 to move along the point 39 and raise the actuator 27 away from the ratchet wheel 28 so that the actuator will not engage the wheel 28 during the return movement of the actuator, or will engage it only enough to ensure operation of the cam arm 36, and without enough force to turn the wheel 28. When the actuator is operated again, the cam arm 36 initially engages the point 37 and moves along it so that the initial movement of the cam 27 is downwardly into engagement with the ratchet wheel 28.

It will be observed that the change in actuator 27 as compared with its form in the copending Dorsam application does not materially alter its operation, except that the omission of some of the teeth therefrom limits the amount which it will rotate the wheel 28. It still may be assembled very easily by first inserting the cam arm 36 through the opening therefor in support plate 12 and then swinging it into place as seen in Fig. 4. The end portion 32 may still be turned over to one side as indicated by the dotted line in each of Figs. 4 to 6.

Inasmuch as the actuator 27 can only move the wheel 28 a predetermined amount no matter how much the actuator moves, it is practical to provide an excess of movement so that initial relative positions of cam 26 and actuator 27 may vary considerably without altering the amount that the chart is moved. The cam 26, therefore, has a throw which is more than would be necessary to move the wheel 28 the desired amount if there were no motion lost. Hence, even if the cam 26 is initially considerably further from actuator 27 than seen in Fig. 4, it will move the actuator 27 far enough to rotate the wheel 28 the desired amount.

Figure 2:
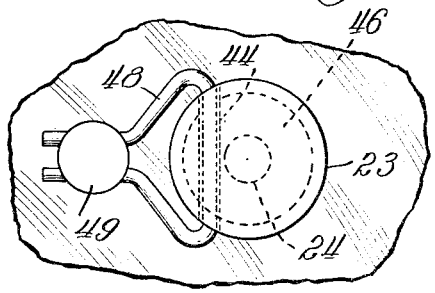
Fig. 2 is a fragmentary view showing in detail the front of the operating button.
Figure 3:
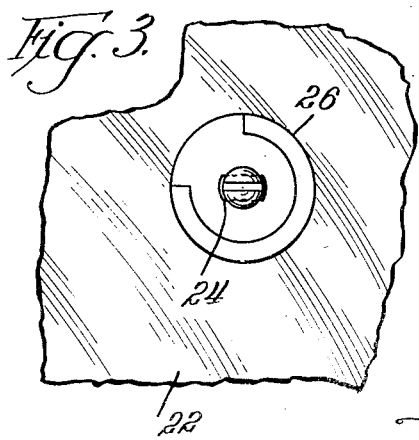
Fig. 3 is a similar view showing the rear face of the operating cam.

Of course, it is necessary that the cam 26 be rotated one complete revolution. This is virtually ensured by providing a spring detent 41 which engages a recess 42 in the knob 23 as the knob completes its revolution. At this time, slots 43 in the knob are aligned with a slot 44 in the hub 46 of bushing 47 so that, as seen in Fig. 2, a sealing wire 48 may be passed through and sealed with a conventional lead seal 49.

The cam 26 may be secured to the shaft 24 in any desired manner which prevents relative turning. In the illustrated form, the shaft 24 is notched to provide two flat sides and shoulders and the cam 26 has a hole shaped to fit these parts, thus preventing turning, the cam being held in place by a screw 51.

From the foregoing it is seen that a very simple and dependable construction is provided for moving the wheel 28 and the chart a predetermined amount in spite of variations in the relative positioning of the actuating parts carried by the meter cover and the internal parts.

We claim:

1. A combination of a base, a device carried by the base, a cover carried by the base and including a knob carried by the cover in fixed axial position, a ratchet wheel associated with the device and adapted to advance the device upon being turned, a ratchet actuator carried independently of the cover, and cam means carried by the cover and associated with the knob on the cover for actuating the actuator, said actuator including tooth means arranged to turn the ratchet wheel upon actuation of the actuator by the cam, said actuator being relieved beyond the tooth means to make the actuator incapable of turning the ratchet wheel more than a predetermined amount, and said cam having a throw substantially greater than is necessary to cause rotation of the ratchet wheel said predetermined amount, whereby considerable variation may be tolerated in the relative positioning of the cover and the actuator, said knob having seal receiving formations associated therewith which are aligned to receive the seal only when the knob has been turned to a position corresponding to the correct amount of turning for operating said ratchet actuator through one complete cycle of operation.

2. A combination of an instrument base, an instrument carried by the base and including a device, a cover carried by the base and including a knob carried by the cover in fixed axial position, a ratchet wheel associated with the device and adapted to advance the device upon being turned, a ratchet actuator carried by the instrument, and cam means carried by the cover and associated with the knob on the cover for actuating the actuator, said actuator including tooth means arranged to turn the ratchet wheel upon actuation of the actuator by the cam, said actuator being relieved beyond the tooth means to make the actuator incapable of turning the ratchet wheel more than a predetermined amount, and said cam having a throw substantially greater than is necessary to cause rotation of the ratchet wheel said predetermined amount, whereby considerable variation may be tolerated in the relative positioning of the cover and the actuator.

3. A combination of a base, a device carried by the base, a cover carried by the base and including a knob carried by the cover in fixed axial position, a ratchet wheel associated with the device and adapted to advance the device upon being turned, a ratchet actuator adapted to actuate the ratchet wheel, and cam means associated with the knob on the cover for actuating the actuator, said actuator including tooth means arranged to turn the ratchet wheel upon actuation of the actuator by the cam, said actuator being relieved beyond the tooth means to make the actuator incapable of turning the ratchet wheel more than a predetermined amount, and said cam having a throw substantially greater than is necessary to cause rotation of the ratchet wheel said predetermined amount, whereby considerable variation may be tolerated in the relative positioning of the cover and the actuator.

4. A combination of a base, a device carried by the base, a cover carried by the base and including a knob carried by the cover in fixed axial position, a ratchet wheel associated with the device and adapted to advance the device upon being turned, a ratchet actuator carried independently of the cover, and cam means carried by the cover and associated with the knob on the cover for actuating the actuator, said actuator including tooth means arranged to turn the ratchet wheel upon actuation of the actuator by the cam, said actuator being relieved beyond the tooth means to make the actuator incapable of turning the ratchet wheel more than a predetermined amount, and said cam having a throw substantially greater than is necessary to cause rotation of the ratchet wheel said predetermined amount, whereby considerable variation may be tolerated in the relative positioning of the cover and the actuator, and spring detent means associated with said knob for indicating when it has been turned the correct amount for operating said ratchet actuator through one complete cycle of operation.

5. A combination of a base, a device carried by the base, a cover carried by the base and including a member carried by the cover, a ratchet wheel carried by the device and adapted to advance the device upon being turned, a ratchet actuator associated with the wheel to turn it when actuated, and means associated with the operating member on the cover for actuating the actuator, said actuator including tooth means arranged to turn the ratchet wheel upon actuation of the actuator and being relieved beyond the tooth means to make the actuator incapable of turning the ratchet wheel more than a predetermined amount, and said operating member and associated means having a throw substantially greater than is necessary to cause rotation of the ratchet wheel said predetermined amount, whereby considerable variation may be tolerated in the relative positioning of the cover and the actuator.

6. A combination of a base, a device carried by the base, a cover carried by the base and including a member carried by the cover, a ratchet wheel carried by the device and adapted to advance the device upon being turned, a ratchet actuator associated with the wheel to turn it when actuated, and means associated with the operating member on the cover for actuating the actuator, said actuator including tooth means arranged to turn the ratchet wheel upon actuation of the actuator and being relieved beyond the tooth means to make the actuator incapable of turning the ratchet wheel more than a predetermined amount, and said operating member and associated means having a throw substantially greater than is necessary to cause rotation of the ratchet wheel said predetermined amount, whereby considerable variation may be tolerated in the relative positioning of the cover and the actuator, and spring detent means associated with said operating member for indicating when it has been moved the correct amount for operating said ratchet actuator through one complete cycle of operation.

7. A combination of an instrument base, an instrument carried by the base and including a device, a cover carried by the base and including a knob carried by the cover in fixed axial position, a ratchet wheel associated with the device and adapted to advance the device upon being turned, a ratchet actuator carried by the instrument, and cam means carried by the cover and associated with the knob on the cover for actuating the actuator, said actuator including tooth means arranged to turn the ratchet wheel upon actuation of the actuator by the cam, said tooth means terminating at a point rendering the actuator incapable of turning the ratchet wheel other than a predetermined amount, said actuator being free to move beyond the point at which said tooth means leave the ratchet wheel, and said cam having a throw substantially greater than is necessary to cause rotation of the ratchet wheel said predetermined amount, whereby considerable variation may be tolerated in the relative positioning of the cover and the actuator.

WILLIAM J. DORSAM.
LOUIS A. PAINE.
RICHARD A. ROAD.

REFERENCES CITED

The following references are of record in the file of this patent:

UNITED STATES PATENTS

| Number | Name | Date |
| --- | --- | --- |
| 1,098,509 | Krauth | June 2, 1914 |
| 1,248,678 | Landsiedel | Dec. 4, 1917 |
| 1,563,382 | Legg | Dec. 1, 1925 |
| 1,652,185 | Slaten | Dec. 13, 1927 |
| 1,957,120 | Weiss | May 1, 1934 |
| 2,246,034 | Elison | June 17, 1941 |
| 2,464,220 | Duncan et al. | Mar. 15, 1949 |